S. D. MASTER.
TIRE.
APPLICATION FILED JULY 11, 1919. RENEWED JUNE 11, 1921.
1,385,882.  Patented July 26, 1921.
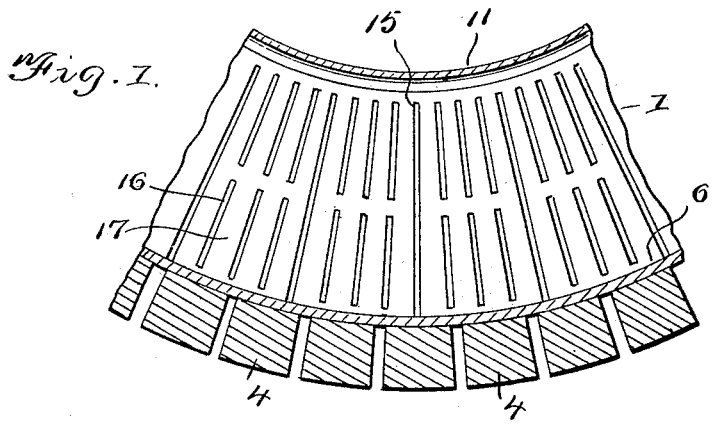
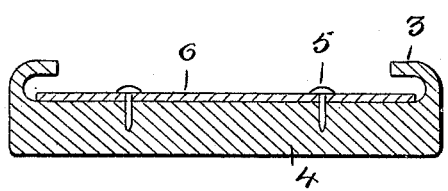
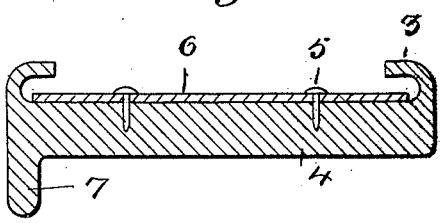
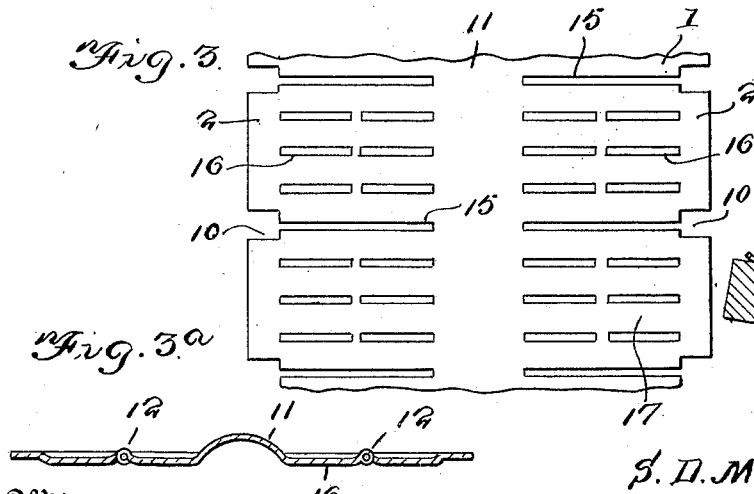
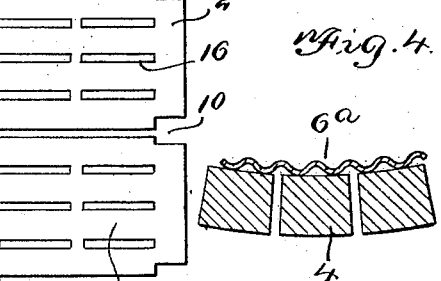
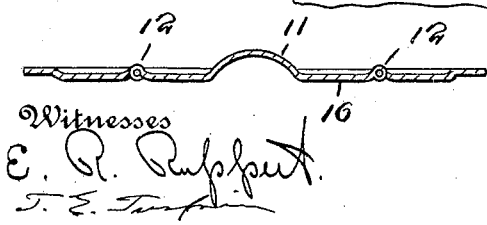
Inventor
S. D. Master
By Victor J. Evans
Attorney
Witnesses

UNITED STATES PATENT OFFICE.

SHAVERKSHA D. MASTER, OF BOMBAY, INDIA.

TIRE.

1,385,882.  Specification of Letters Patent.  Patented July 26, 1921.

Application filed July 11, 1919, Serial No. 310,034. Renewed June 11, 1921. Serial No. 476,966.

*To all whom it may concern:*

Be it known that I, SHAVERKSHA DORABJI MASTER, a subject of the King of England, residing at Bombay, India, have invented new and useful Improvements in Tires, of which the following is a specification.

One of the objects of my present invention is the provision of an improved and highly elastic tread member susceptible of use to advantage in the tire constituting the subject of my contemporary application, filed July 11, 1919, Serial No. 310,033.

Another object of the present invention is the provision of a tire casing adapted to be used to advantage in the tire of my contemporary application aforesaid, or in an ordinary tire, and embodying such a construction that it is possessed of the requisite resiliency, and yet is capable of resisting wear, cutting and puncture to a degree.

Other objects and practical advantages of the present invention will be fully understood from the following description and claims when the same are read in connection with the drawings, accompanying and forming part of this specification, in which:

Figure 1 is a longitudinal vertical section of a portion of a tire constructed according to my present invention.

Fig. 2 is a transverse section of the tread member thereof.

Fig. 2ª is a detail section showing a slight modification.

Fig. 3 is a plan view of the casing comprised in my improved tire.

Fig. 3ª is a cross-section of the said casing.

Fig. 4 is a detail longitudinal central section of a slightly modified tread member hereinafter specifically referred to.

Similar numerals designate corresponding parts in Figs. 1 to 3, to which reference will first be had.

The casing 1 is provided on its longitudinal edges with spaced clencher flanges 2, and these latter are disposed and held in the spaced, inturned flanges 3 at the ends of spaced metallic blocks 4. The said blocks 4 are included in the novel tread member and are arranged transversely upon and are connected by screws 5 or other suitable means to a metallic plate 6. The tread constructed as described has been found, because of its high flexibility, to be well adapted for use on ordinary roads, and is also well adapted to run on rails, inasmuch as each of the metallic blocks 4 may, when deemed expedient, be equipped with a flange 7 at one of its ends as shown in Fig. 2ª. The metallic plate 6, of continuous straight character, is designed particularly for use when the tire is to run upon rails, though it is also capable of serving to advantage when the tire is to run on a roadway.

When desirable I may employ in lieu of the continuous straight metallic plate 6, a corrugated metallic plate 6ª such as shown in Fig. 4; the said plate 6ª having the additional advantage of great flexibility and being therefore adapted to contribute materially to the springy quality of the tire as a whole.

The casing 1, best shown in Fig. 3, is provided, as before stated, with clencher flanges 2, separated by intervening spaces 10. The said casing is also provided with a longitudinal central rib 11, designed to be opposed to and when necessary seated in a recess in the perimeter of a wheel body, and it is further provided by preference, though not necessarily, with longitudinal hinged pins 12 to flexibly connect the sections of the casing 1 when the same is made in sections. The said casing may be and preferably is made of metal, though it may be made of any other material compatible with my invention. The metal is preferred because of its capacity to resist wear and prevent injury to the inner tube 13, in order to lend the requisite flexibility to the metallic or analogous casing 1, especially when the casing is made of sheet-metal and the hinged pins 12 are omitted. The same is provided with spaces 15 that reach from the sides of the rib 11 to the intervening spaces 10, and is also provided with groups of comparatively short spaces 16 which are closed at their ends and are grouped as shown between the long spaces 15.

Manifestly the improved casing 1 may be used in conjunction with an ordinary wheel rim, or in conjunction with the tread member of Figs. 1 to 4, in which latter event the rib 11 will be seated in the perimeter of a wheel body as aforesaid.

It will be apparent from the foregoing that the tire of my present invention embodies not only a peculiar and advantageous tread member, but a peculiar and advantageous casing. It will also be apparent by comparison of Figs. 3 and 3ª that between the transverse spaces 15 and 16 the casing 1 is provided with transverse ribs 17.

When the casing 1 is formed in sections and the hinged pins 12 are employed, the portions at the opposite sides of the hinged pins, with reference to the rib 11, form limbs 18 which may obviously be adjusted with facility to engage the flanges 2 on the said limbs with the flanges 3 on the metallic blocks 4 of the tread member.

It will be apparent from the foregoing that my invention resides in a tread member or outer casing for tires, and that, therefore, any appropriate tire means may be employed within the tread member or casing without affecting my invention as claimed.

Having described my invention, what I claim and desire to secure by Letters-Patent, is:

1. A tread member for tires comprising a metallic backing, and spaced apart metallic blocks arranged transversely at the outer side of and fixed to said backing and each block having inturned flanges at its ends; the said metallic backing being in the form of a transversely corrugated plate and therefore flexible, and the said flanges being also spaced apart.

2. A casing for tires, having a longitudinal central rib and also having clencher flanges on its edges separated by intervening spaces, and further having transverse spaces extending from said rib to said intervening spaces, and comparatively short spaces grouped between the first-named transverse spaces, the portions between the transverse spaces constituting transverse ribs that reach laterally from opposite sides of the longitudinal central rib.

3. A casing for tires, having a longitudinal central rib and also having clencher flanges on its edges separated by intervening spaces, and further having transverse spaces extending from said rib to said intervening spaces, and comparatively short spaces grouped between the transverse spaces constituting transverse ribs that reach laterally from opposite sides of the longitudinal center rib; the said casing being formed in sections and having hinge pins connecting its side portions or limbs with the major portion.

In testimony whereof I affix my signature.

SHAVERKSHA D. MASTER.